(12) United States Patent
Mather et al.

(10) Patent No.: US 9,873,383 B1
(45) Date of Patent: Jan. 23, 2018

(54) DEPLOYABLE UNDER-SEAT CARGO ASSEMBLY

(71) Applicants: Carl Mather, Lake Orion, MI (US); Dorinel Neag, Commerce Township, MI (US)

(72) Inventors: Carl Mather, Lake Orion, MI (US); Dorinel Neag, Commerce Township, MI (US)

(73) Assignee: FCA US LLC, Auburn Hills, MI (US)

( * ) Notice: Subject to any disclaimer, the term of this patent is extended or adjusted under 35 U.S.C. 154(b) by 0 days.

(21) Appl. No.: 15/471,127

(22) Filed: Mar. 28, 2017

(51) Int. Cl.
*B60R 7/04* (2006.01)
*B60N 2/02* (2006.01)

(52) U.S. Cl.
CPC ............... *B60R 7/043* (2013.01); *B60N 2/02* (2013.01)

(58) Field of Classification Search
CPC ....................................................... B60R 7/043
USPC ............................................ 296/37.14, 37.15
See application file for complete search history.

(56) References Cited

U.S. PATENT DOCUMENTS

| | | | |
|---|---|---|---|
| 5,902,009 A * | 5/1999 | Singh ...................... | B60N 2/44 296/37.15 |
| 6,074,000 A | 6/2000 | Wagner | |
| 6,106,044 A * | 8/2000 | Schlachter .............. | B60R 7/043 296/37.15 |
| 6,644,523 B1 | 11/2003 | Salas | |
| 6,824,029 B2 * | 11/2004 | Tuel, Jr. .................. | B60R 7/043 220/532 |
| 7,121,606 B2 * | 10/2006 | Khan ...................... | B60R 7/043 224/275 |
| 7,341,301 B1 | 3/2008 | Schambre et al. | |
| 7,780,229 B2 | 8/2010 | Verhee | |
| 8,128,163 B2 | 3/2012 | Alberti | |
| 8,770,661 B2 * | 7/2014 | Kalergis .................. | B60R 7/043 296/37.15 |
| 9,016,749 B2 * | 4/2015 | Mueller .................. | B60R 5/006 296/37.14 |
| 2010/0231011 A1* | 9/2010 | Lindsay .................. | B60R 7/043 297/188.11 |
| 2016/0200258 A1* | 7/2016 | Chawlk ................... | B60R 7/043 296/37.14 |
| 2017/0072863 A1* | 3/2017 | Rowland ................. | B60R 7/043 |

* cited by examiner

*Primary Examiner* — Gregory Blankenship
(74) *Attorney, Agent, or Firm* — Ralph E. Smith

(57) ABSTRACT

A vehicle cargo assembly that is located between a seat and a floor of the vehicle, including a support member that supports the seat and is fixed to the floor; a receptacle body that is movably coupled to the support member between a stowed and deployed position; a pair of bracket plates that are fixed to opposing ends of the support member; and a pair of cover plates that rotatably couple the receptacle body to the pair of brackets plates, wherein the receptacle body is movable between the stowed position in which the receptacle body defines a storage compartment, and a deployed position in which the receptacle body, the pair of cover plates, and the pair of bracket plates define the storage compartment.

19 Claims, 13 Drawing Sheets

DEPLOYABLE UNDER-SEAT CARGO ASSEMBLY

FIELD

The present disclosure relates to a deployable under-seat cargo assembly.

BACKGROUND

Some vehicles include cargo compartments for storing various miscellaneous items so that the items do not roll or move around on the vehicle floor while the vehicle is in motion. These compartments are difficult to operate and do not adapt well to different vehicle floor configurations. Furthermore, these compartments provide limited storage space, which makes it difficult for adding items that are accumulated over the course of the occupant's travel.

SUMMARY

This section provides a general summary of the disclosure, and is not a comprehensive disclosure of its full scope or all of its features.

The present disclosure provides a vehicle cargo assembly that is conveniently operable, features additional storage space, and is adaptable to various vehicle floor configurations.

In one form, a vehicle cargo assembly that is located between a seat and a floor of the vehicle includes a support member, a receptacle body, a pair of bracket plates, and a pair of cover plates. The support member supports the seat and is fixed to the floor. The receptacle body is movably coupled to the support member between a stowed and deployed position. The pair of bracket plates are fixed to opposing ends of the support member. The pair of cover plates rotatably coupled the receptacle body to the pair of bracket plates. The receptacle body is movable between the stowed position in which the receptacle body defines a storage compartment, and a deployed position in which the receptacle body, the pair of cover plates, and the pair of bracket plates define the storage compartment.

In some configurations, the receptacle body includes a pair of slots formed therein for receipt of the pair of cover plates in the stowed position.

In some configurations, the bracket plate defines a slot for receipt of the cover plate such that the cover plate is positioned between the slot of the receptacle body and the slot of the bracket plate when in the stowed position.

In some configurations, the cover plate extends from the slot of the receptacle body when in the deployed position, and forms a wall of the storage compartment when in the deployed position.

In some configurations, each rail assembly of a pair of rail assemblies is attached to a corresponding bracket plate of the pair of bracket plates and attached to a corresponding end of the receptacle body.

In some configurations, the receptacle body defines a pair of cavities and each rail assembly is received within a respective cavity in the stowed position and extends from the respective cavity in the deployed position.

In some configurations each bracket plate includes a vertically oriented slot of the bracket plate.

In some configurations, each cover plate includes a pin that is engaged with the vertically oriented slot of the bracket plate.

In some configurations, the pin vertically traverses the slot as the cover plate rotates relative to the bracket plate during movement of the receptacle body to the deployed position.

In some configurations, the cover plate is rotatably engaged to the corresponding bracket plate via a link set having a front link and a rear link, and wherein the receptacle body is connected to the cover plate via the link set.

In some configurations, the link set extends through a slot formed in the cover plate.

In another form, a vehicle cargo assembly that is located between a seat and a floor of the vehicle includes a support member, an elongated receptacle body, a pair of stationary bracket plates, and a pair of cover plates. The support member supports the seat and is fixed to the floor. The elongated receptacle body is movably coupled to the support member between a stowed position and a deployed position. The pair of stationary bracket plates rotatably couple the receptacle body to the pair of stationary bracket plates. The receptacle body is movable between the stowed position in which the receptacle body defines a storage compartment, and the deployed position in which the receptacle body, the pair of cover plates, and the pair of bracket plates define the storage compartment. The receptacle body defines a pair of cavities for receipt of the cover plates when the receptacle body is in the stowed position. The cover plates extend from the slots to define a wall of the storage compartment when the receptacle body is in the deployed position.

In some configurations, each rail assembly of a pair of rail assemblies is attached to a corresponding bracket plate of the pair of bracket plates and attached to a corresponding end of the receptacle body.

In some configurations, each rail assembly is received within a respective cavity in the stowed position and extends from the respective cavity in the deployed position.

In some configurations, each bracket plate includes a vertically oriented slot that is adjacent to a respective rail assembly.

In some configurations, the cover plate includes a pin that is engaged with the vertically oriented slot of the bracket plate.

In some configurations, the pin vertically traverse the slot as the cover plate rotates relative to the bracket plate during movement of the receptacle body to the deployed position.

In some configuration, the cover plate is rotatably engaged to the corresponding bracket plate via a link set having a front link and a rear link, and wherein the receptacle body is connected to the cover plate via the link set.

In some configuration, wherein the link set extends through a slot formed in the cover plate.

Further areas of applicability of the teachings of the present disclosure will become apparent from the detailed description, claims and the drawings provided hereinafter, wherein like reference numerals refer to like features throughout the several views of the drawings. It should be understood that the detailed description, including disclosed embodiments and drawings referenced therein, are merely exemplary in nature intended for purposes of illustration only and are not intended to limit the scope of the present disclosure, its application or uses. Thus, variations that do not depart from the gist of the present disclosure are intended to be within the scope of the present disclosure.

BRIEF DESCRIPTION OF THE DRAWINGS

The drawings described herein are for illustrative purposes only of selected embodiments and not all possible implementations, and are not intended to limit the scope of the present disclosure.

Corresponding reference numerals indicate corresponding parts throughout the several views of the drawings.

DETAILED DESCRIPTION

Example embodiments will now be described more fully with reference to the accompanying drawings.

Figure 1:
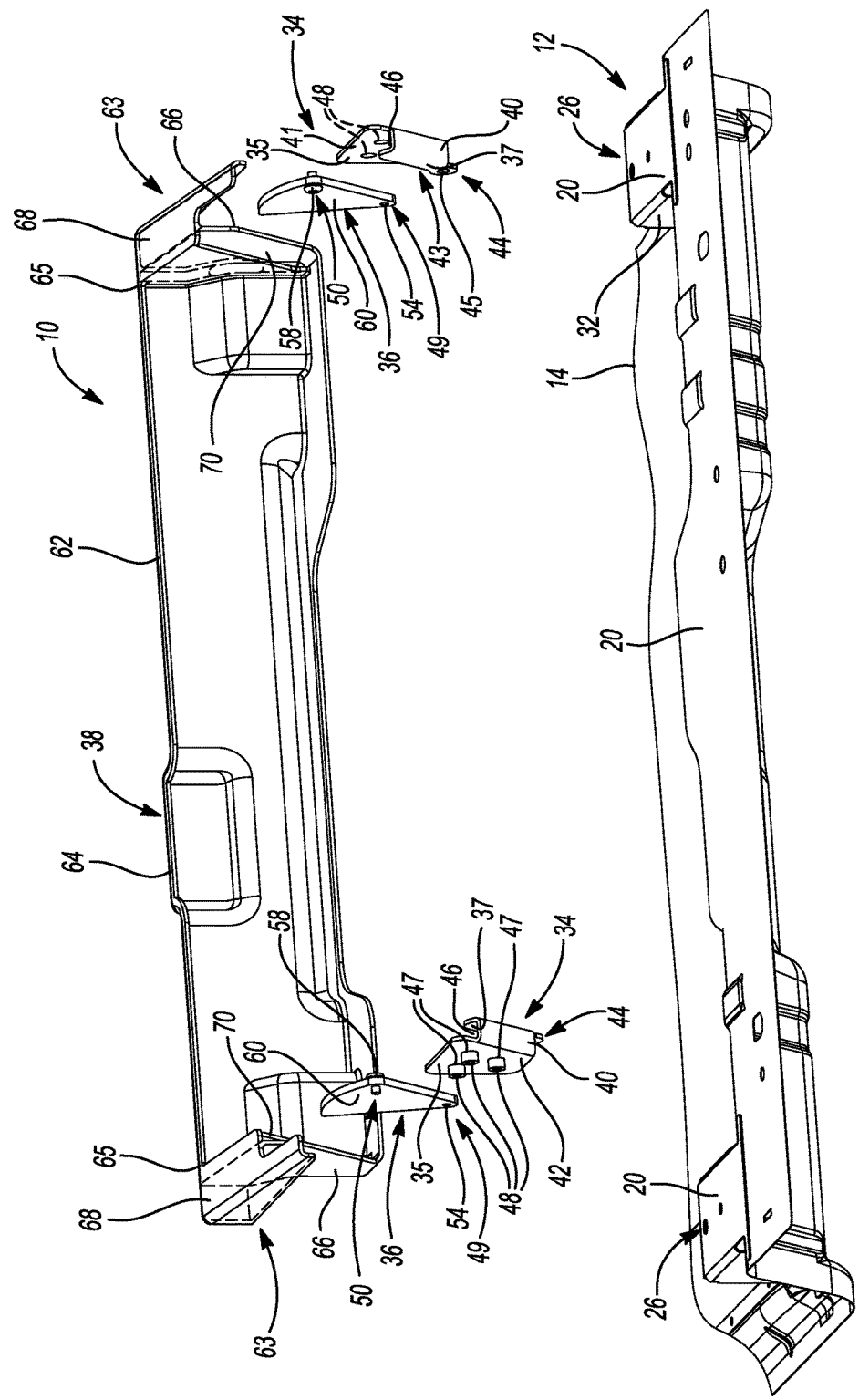
FIG. 1 is an exploded view of a vehicle cargo assembly according to the principles of the present disclosure.
Figure 2:
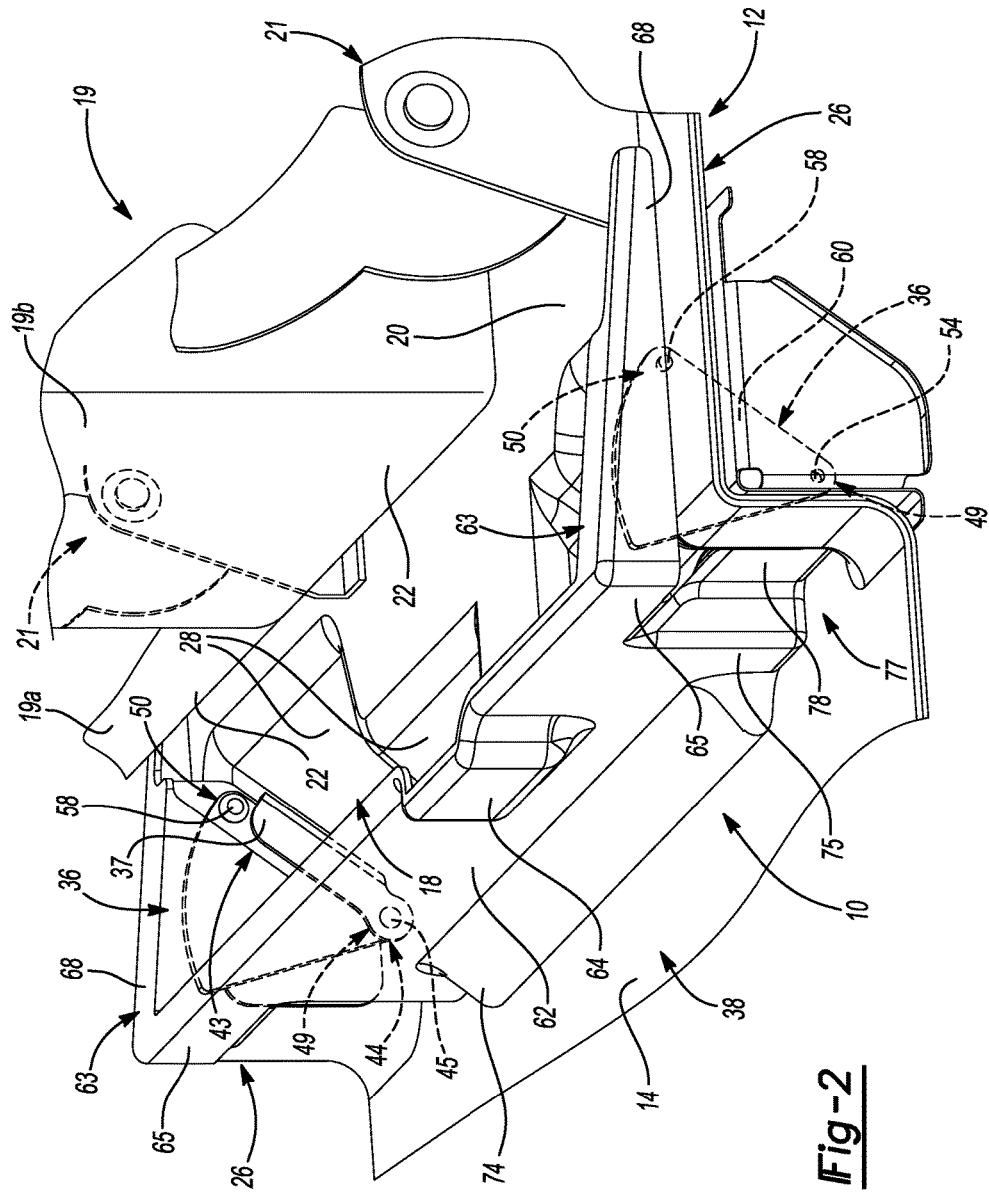
FIG. 2 is a perspective view of the vehicle cargo assembly of FIG. 1 attached to an elongate seat support member of a vehicle floor in a stowed position with seat bottoms in a lifted state.
Figure 3:
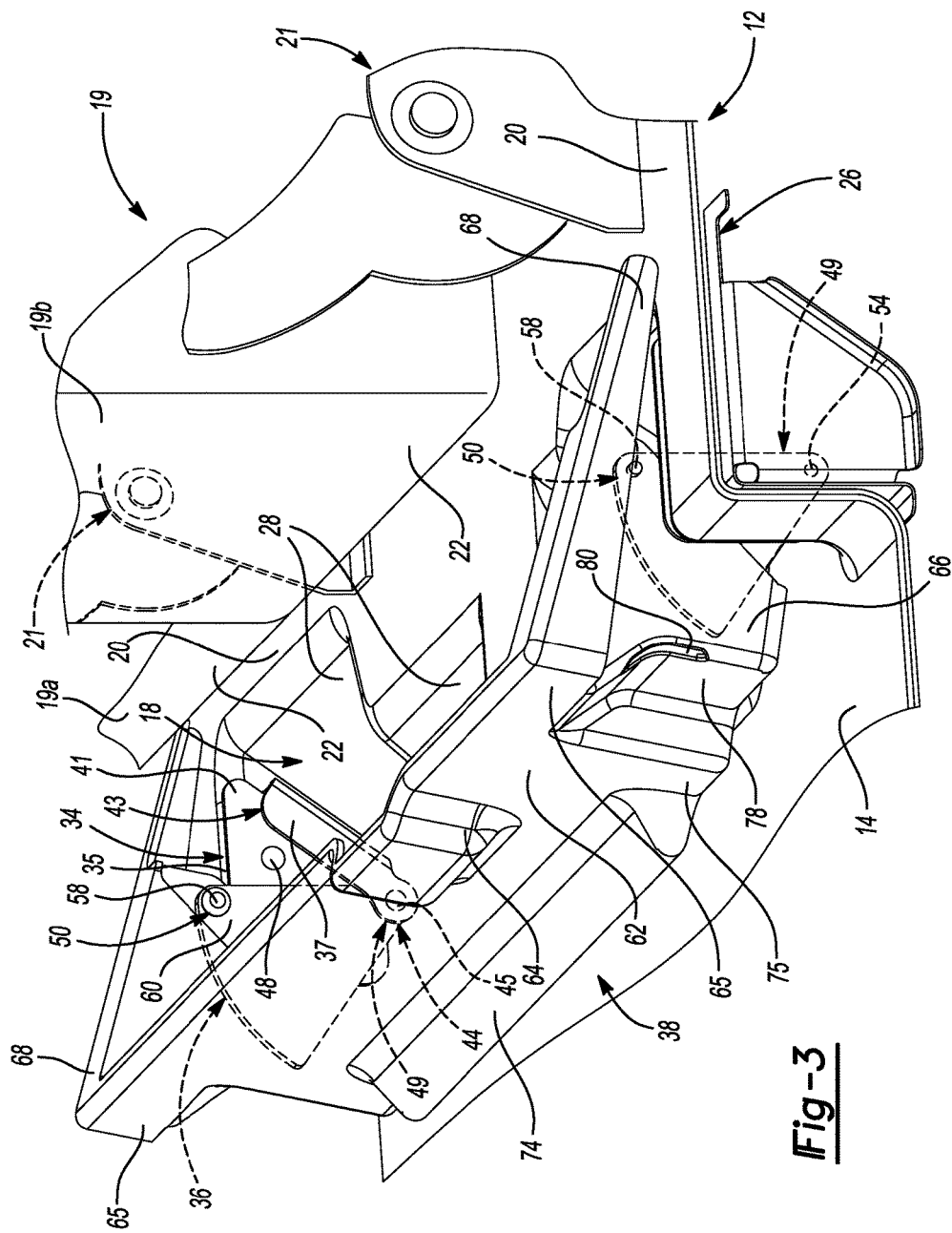
FIG. 3 is a perspective view of the vehicle cargo assembly of FIG. 1 attached to the elongate seat support member of the vehicle floor being moved to a deployed position with the seat bottoms in the lifted state.
Figure 4:
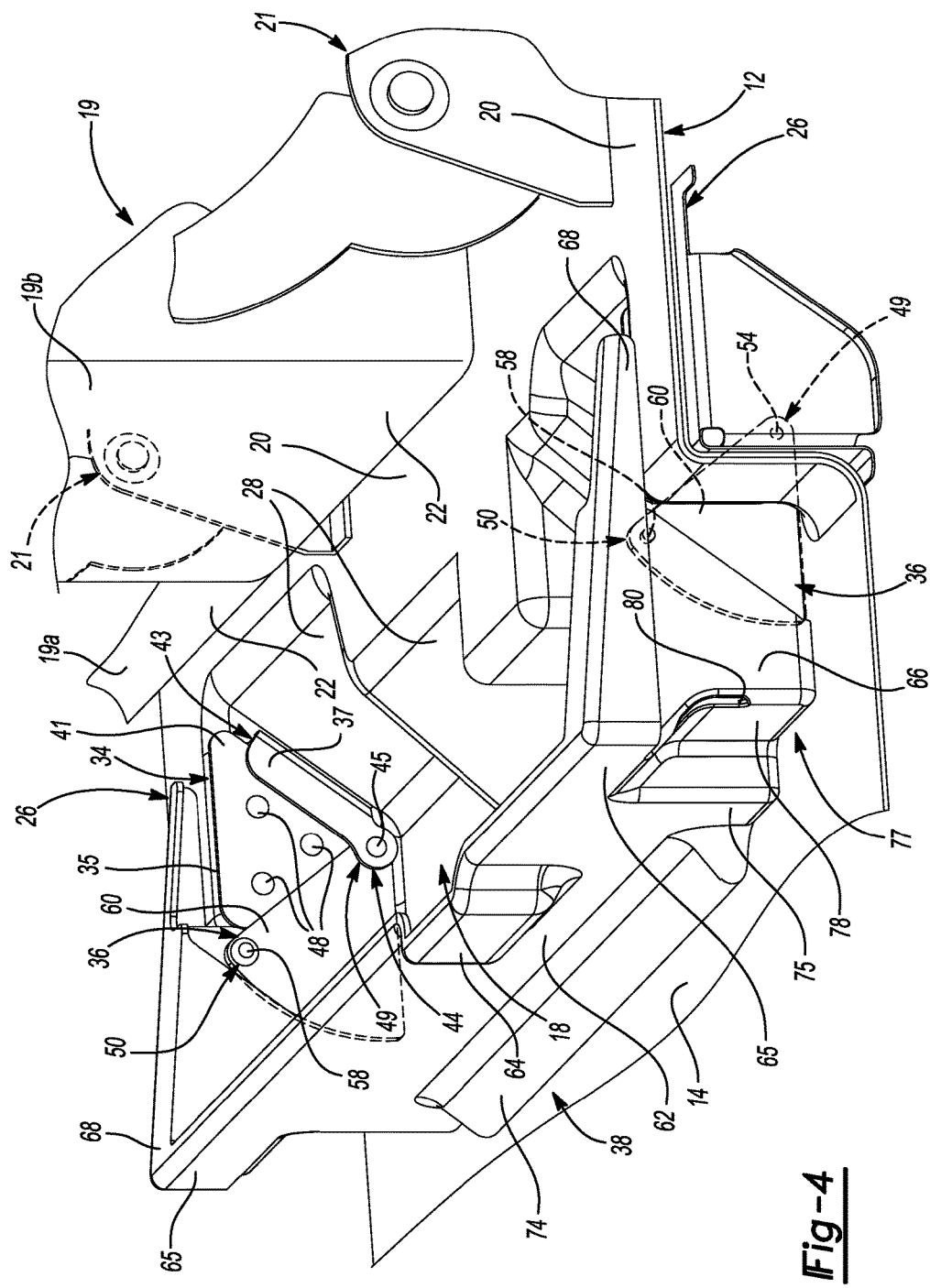
FIG. 4 is a perspective view of the vehicle cargo assembly of FIG. 1 attached to the elongate seat support member of the vehicle floor in the deployed position with the seat bottoms in the lifted state.
Figure 5:
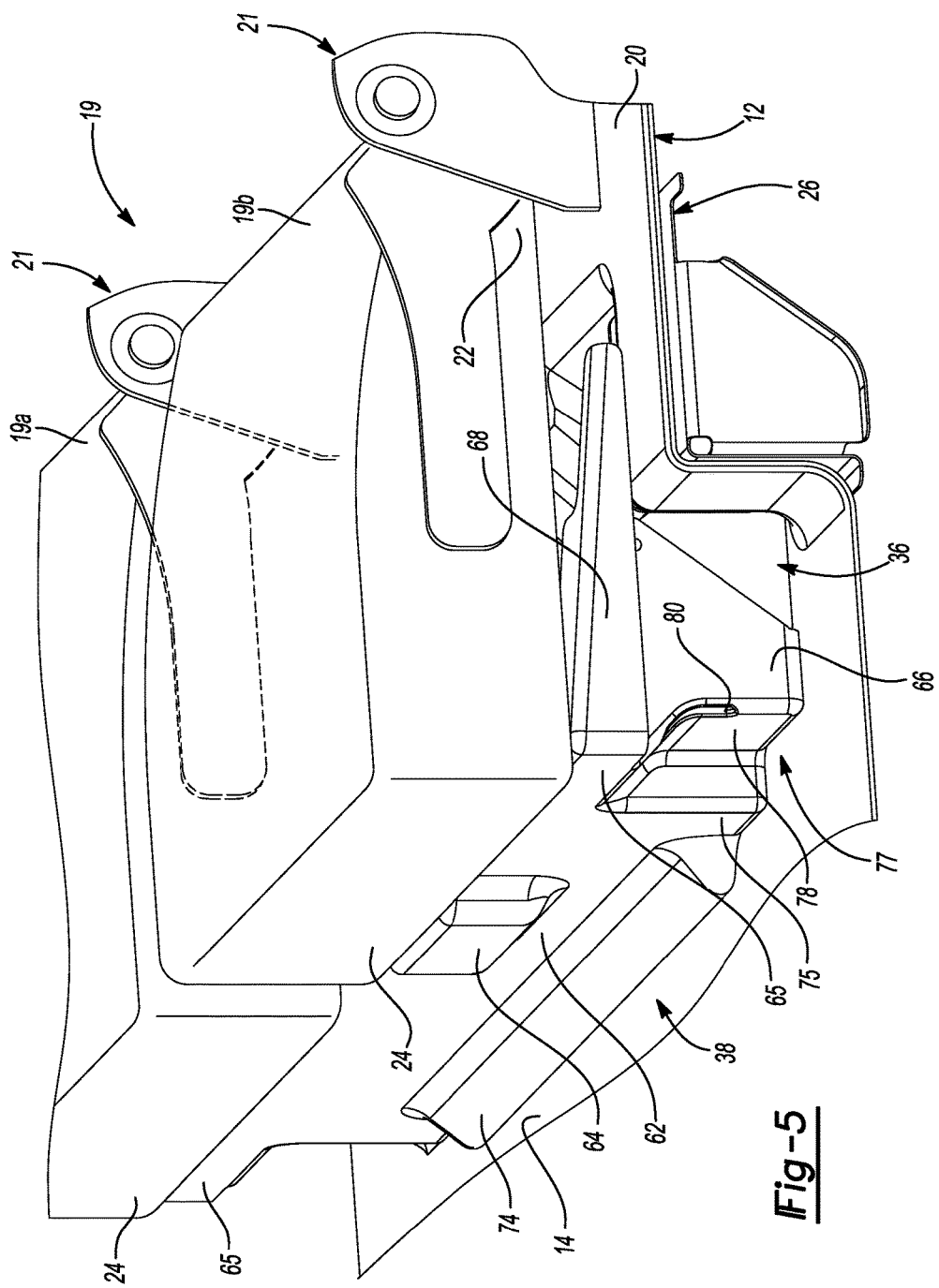
FIG. 5 is a perspective view of the vehicle cargo assembly of FIG. 1 attached to the elongate seat support member of the vehicle floor in the deployed position with the seat bottoms in a seated state.

With reference to FIGS. 1-5, a vehicle cargo assembly 10 is movably attached to an elongated seat support member 12 extending from a vehicle floor 14 such that the vehicle cargo assembly 10 and the elongated seat support member 12 cooperate to form a storage compartment 18. Right and left seat bottoms 19a, 19b (together known as a set of seat bottoms 19) of a vehicle seat assembly are positioned adjacent to each other, and independently coupled to a top surface 20 of the elongated seat support member 12 via a pair of runner assemblies 21 (only one pair shown on the left seat bottom 19b). The right and left seat bottoms 19a, 19b are also independently rotatable between a seated state (FIG. 5) and a lifted state (FIGS. 2-4). As will be described in more detail below, the vehicle cargo assembly 10 is movable between a stowed position in which the storage compartment 18 is situated at or near a rear end 22 of the set of seat bottoms 19 when in the lifted (FIG. 2) or seated state, and a deployed position in which the storage compartment 18 extends to or near a front end 24 of the set of seat bottoms 19 when in the seated state (FIG. 5).

The elongated seat support member 12 extending from the vehicle floor 14 includes end portions 26, with a plurality of sloped surfaces 28 located between the end portions 26. The end portions 26 include an inner wall 32 (FIG. 1) that extends perpendicular from the top surface 20 of the elongated seat support member 12. Each inner wall 32 includes a plurality of apertures 33 (FIG. 6) at or near an upper portion thereof. The plurality of sloped surfaces 28 extend from the top surface 20 of the elongated seat support member 12 to the vehicle floor 14, and are so shaped to accommodate contours of the vehicle floor 14.

The vehicle cargo assembly 10 includes a pair of bracket plates 34, a pair of triangular cover plates 36, and a U-shaped receptacle body 38. Each bracket plate 34 is configured for attachment to a corresponding inner wall 32 of the end portions 26 (FIGS. 3 and 4). Each bracket plate 34 includes an inner wall plate 35, a link 37, and an adapter member 40 (FIG. 1). The inner wall plate 35 includes a front surface 41 and a rear surface 42. Inner wall plate 35 is attached to the inner wall 32 of the end portion 26 using a plurality of fasteners 47 that correspond to apertures 48 formed in the inner wall plate 35

The link 37 is connected to the inner wall plate 35 via the adapter member 40 (FIG. 1). The link 37 includes a connector portion 43 and a pivot portion 44. The connector portion 43 is substantially rectangular and is oriented perpendicular to the adapter member 40 (FIG. 1). The pivot portion 44 is substantially circular, and extends from the connector portion 43 in a direction toward the vehicle floor 14 (FIG. 4). The pivot portion 44 also includes a pivot aperture 45 extending therethrough. The inner wall plate 35, the link 37, and the adapter member 40 define a slot 46 (FIG. 1) in the bracket plate 34 for receipt of the cover plate 36.

As shown in FIGS. 1-4, each cover plate 36 includes a pivot bracket end 49 and a receptacle end 50. The pivot bracket end 49 includes an aperture 54 extending therethrough. The pivot bracket end 49 is positioned within the slot 46 (FIGS. 2-4) such that the aperture 54 is aligned with the pivot aperture 45, and then a fastener (not shown) is used that extends through the pivot aperture 45 and the aperture 54 to rotatably couple the cover plate to the bracket plate 34. A fastener 58 extends through an aperture (not shown) at the receptacle end 50 of the cover plate 36 to attach the cover plate 36 to the receptacle body 38. In this way, a portion 60 of the cover plate 36 is received in the slot 46 of the bracket plate 34 when the receptacle body 38 is in the stowed position (FIG. 2) and removed from the slot 46 once the vehicle cargo assembly 10 is in the deployed position (FIG. 4).

As shown in FIGS. 2-5, the U-shaped receptacle body 38 extends underneath the set of seat bottoms 19 and includes an elongated body 62 and end portions 63. The elongated body 62 is substantially rectangular and includes a handle 64 that extends away from the storage compartment 18 at an upper portion of the elongated body 62 to permit a user (not shown) to facilitate movement of the receptacle body 38 between the stowed and deployed positions. Each end portion 63 extends perpendicularly outward from a corresponding end 65 of the elongated body 62 and includes a cover member 66 and an arm 68. The cover member 66 includes a slot or cavity 70 formed therein (FIG. 1).

When the receptacle body 38 is in the stowed position (FIG. 2), the cover plate 36 is substantially entirely received in the slot 70 formed in the cover member 66 as the portion 60 of the cover plate 36 is received in the slot 46 of the bracket plate 34. Once the receptacle body 38 is in the deployed position (FIG. 4), the cover plate 36 is substantially entirely removed from the slot 70 and the portion 60 of the cover plate 36 is removed from the slot 46 of the bracket plate 34 such that the cover plate 36 forms a wall of the storage compartment 18.

The arm 68 is integrally formed adjacent to the cover member 66 such that a portion of the arm 68 contacts the top surface 20 of the elongated seat support member 12 as the receptacle body 38 moves between the stowed position and deployed position. The receptacle body 38 includes design features that accommodate particular needs of a vehicle that the vehicle cargo assembly 10 is installed therein. For example, in the illustrated embodiment, a protruding member 74 projecting from a bottom 75 of the elongated body 62 of the receptacle body 38 facilitates movement of the receptacle body 38 along the vehicle floor 14 between the stowed position and the deployed position. The elongated body 62 of the receptacle body 38 in the exemplary embodiment also includes depressions 77 at each end 65 such that pockets (not shown) in the vehicle floor 14 are accessible once the vehicle cargo assembly 10 is in the deployed position. A wall 78 of each depression 77 includes a slot 80 at a periphery thereof to permit a portion of a corresponding cover plate 36 to enter as the receptacle body 38 is moved to the deployed position.

With continued reference to FIGS. 1-5, operation of the vehicle cargo assembly 10 will be described in detail. When the vehicle cargo assembly 10 is in the stowed position and at least one seat bottom (19a and/or 19b) of the set of seat bottoms 19 is in the lifted state (FIG. 2), the user is able to access the storage compartment 18 to store various items therein, and the storage compartment 18 is defined by the receptacle body 38 at or near the rear end 22 of the set of seat bottoms 19.

If the user desires extra storage space, the user may grasp the handle 64 of the elongated body 62 of the receptacle body 38 and move the receptacle body 38 to the deployed position. During movement of the vehicle cargo assembly 10 to the deployed position, the pair of cover plates 36 rotate relative to the pair of bracket plates 34 to remove the cover plates 36 from the slots 46, 70 of the bracket plate 34 and the cover member 66, respectively (FIG. 3). The bottom 75 of the receptacle body 38 also momentary lifts off the vehicle floor 14 during movement of the vehicle cargo assembly 10 to the deployed position, but once fully in the deployed position, the bottom 75 of the receptacle body 38 is positioned back on the vehicle floor 14. As shown in FIGS. 4 and 5, the at least one seat bottom (19a and/or 19b) is rotated to the seated state (FIG. 5) and the receptacle body 38, the pair of cover plates 36, and the pair of bracket plates 34 define the storage compartment 18 extending from the rear end 22 of the set of seat bottoms 19 to the front end 24 thereof.

With reference to FIGS. 6-9, another vehicle cargo assembly 100 is provided that can be movably attached to the elongated seat support member 12 extending from the vehicle floor 14 instead of the vehicle cargo assembly 10. The structure and function of the vehicle cargo assembly 100 may be similar or identical to that of the vehicle cargo assembly 10, apart from any exceptions described below.

The vehicle cargo assembly 100 is movably attached to the elongated seat support member 12 extending from the vehicle floor 14 such that the vehicle cargo assembly 100 and the elongated seat support member 12 cooperate to form a storage compartment 118. The vehicle cargo assembly 100 includes a pair of bracket plates 134, a pair of cover plates 136, a U-shaped receptacle body 138, and a pair of rail assemblies 139. Each bracket plate 134 includes an inner wall plate 140, a flange 142, and a vertically oriented slot 144. The inner wall plate 140 includes a front surface 146 and a rear surface 148. A plurality of fastening members 150 are used to attach the bracket plate 134 to the inner wall 32. In this regard, fasteners 150 correspond to apertures 152 of the bracket plate 134, and extend through the inner wall plate 140 to be inserted into the plurality of apertures 33 of the inner wall 32 (FIG. 6) to securely attach the bracket plate 134 to the inner wall 32.

The flange 142 extends perpendicularly from a top portion of the bracket plate 134 and seats on the upper surface 20 of elongated seat support member 12 (FIG. 7) to further support the bracket plate 134 attached to the inner wall 32. The vertically oriented slot 144 is positioned adjacent to the flange 142, and extends upwardly from the inner wall plate 140.

Figure 7:
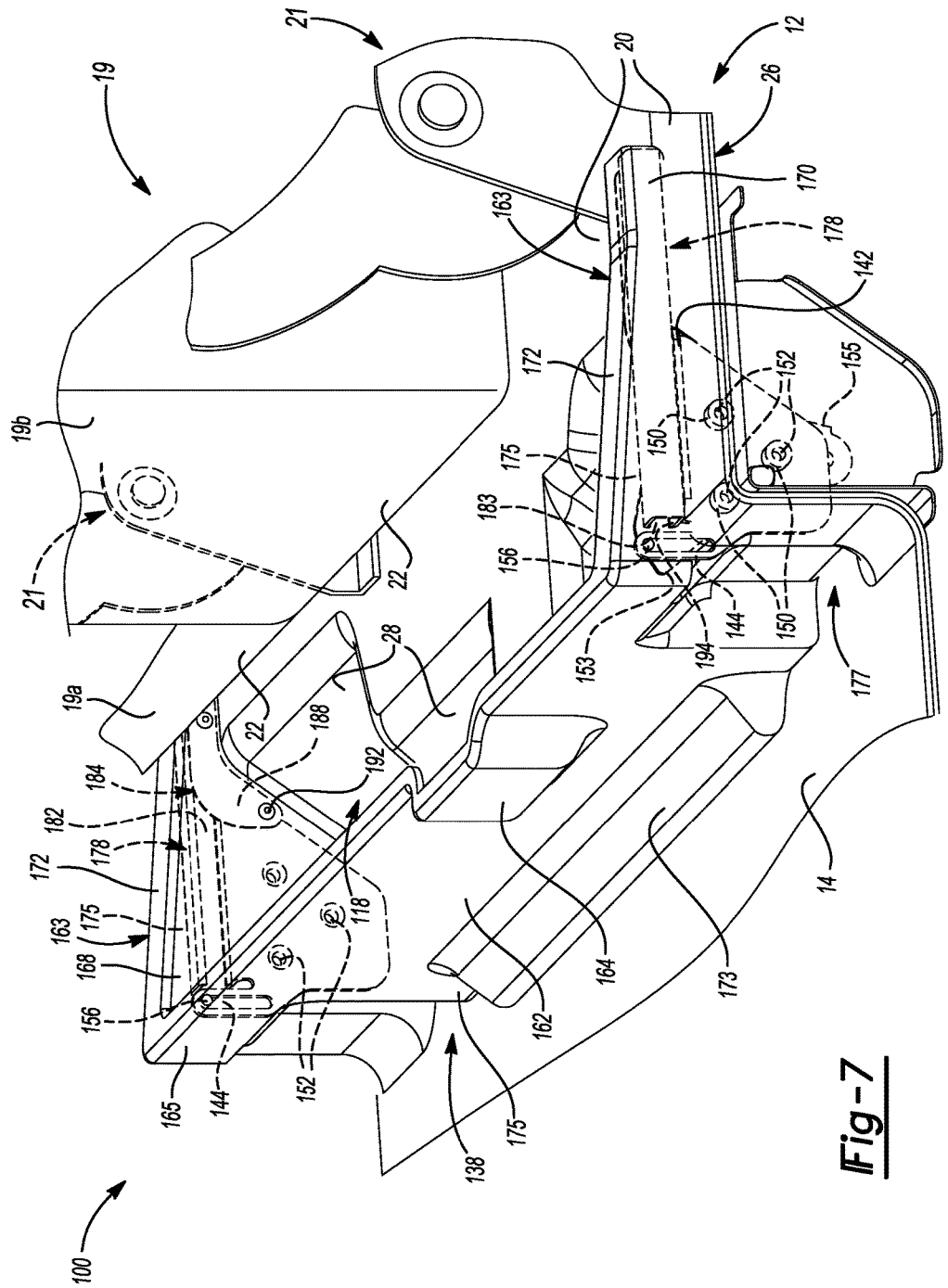
FIG. 7 is a perspective view of the vehicle cargo assembly of FIG. 6 attached to the elongate seat support member of the vehicle floor in a stowed position with the seat bottoms in the lifted state.
Figure 8:
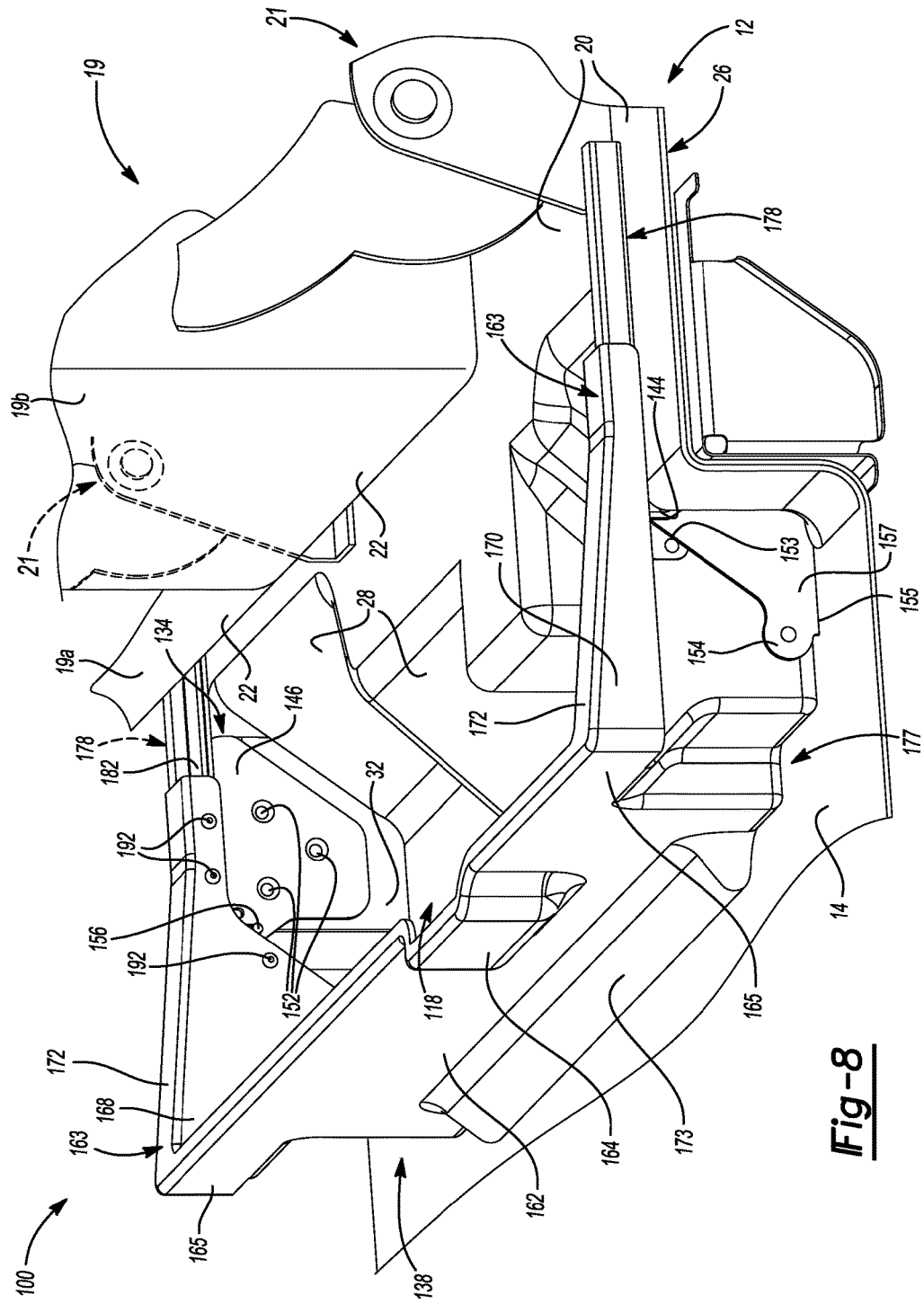
FIG. 8 is a perspective view of the vehicle cargo assembly of FIG. 6 attached to the elongate seat support member of the vehicle floor in a deployed position with the seat bottoms in the lifted state.

Each cover plate 136 is substantially triangular and includes a pivot bracket end 153, a receptacle end 154, and a vehicle floor contact side 155. The pivot bracket end 153 includes a pin 156 extending from an outside surface 157 of the cover plate 136. As shown in FIGS. 7 and 8, the pin 156 extends into the vertically oriented slot 144 of a corresponding bracket plate 134 (FIG. 7) such that the pin 156 is permitted to traverse the slot 144 as the cover plate 136 rotates relative to the bracket plate 134 (FIG. 8). The receptacle end 154 includes an attachment member 160 extending from the inside surface 158 of the cover plate 136. The attachment member 160 attaches the cover plate 136 to the receptacle 138 so that the pin 156 traverses the slot 144 and the cover plate 136 rotates downwardly as the receptacle 138 is moved from the stowed position to the deployed position. The vehicle floor contact side 155 is oriented substantially vertically (FIG. 7) when the receptacle 138 is in the stowed position and is oriented horizontally, abutting the vehicle floor 14 once the receptacle 138 is in the deployed position (FIG. 8). Once the receptacle 138 is in the deployed position, the cover plate 136 forms a wall of the storage compartment 118.

The U-shaped receptacle body 138 extends underneath the set of seat bottoms 19, and includes an elongated body 162 and end members 163. The elongated body 162 is substantially rectangular and includes a handle 164 that extends away from the storage compartment 118 at an upper portion of the body 162 to permit a user to facilitate movement of the receptacle 138 between the stowed and deployed positions.

Figure 6:
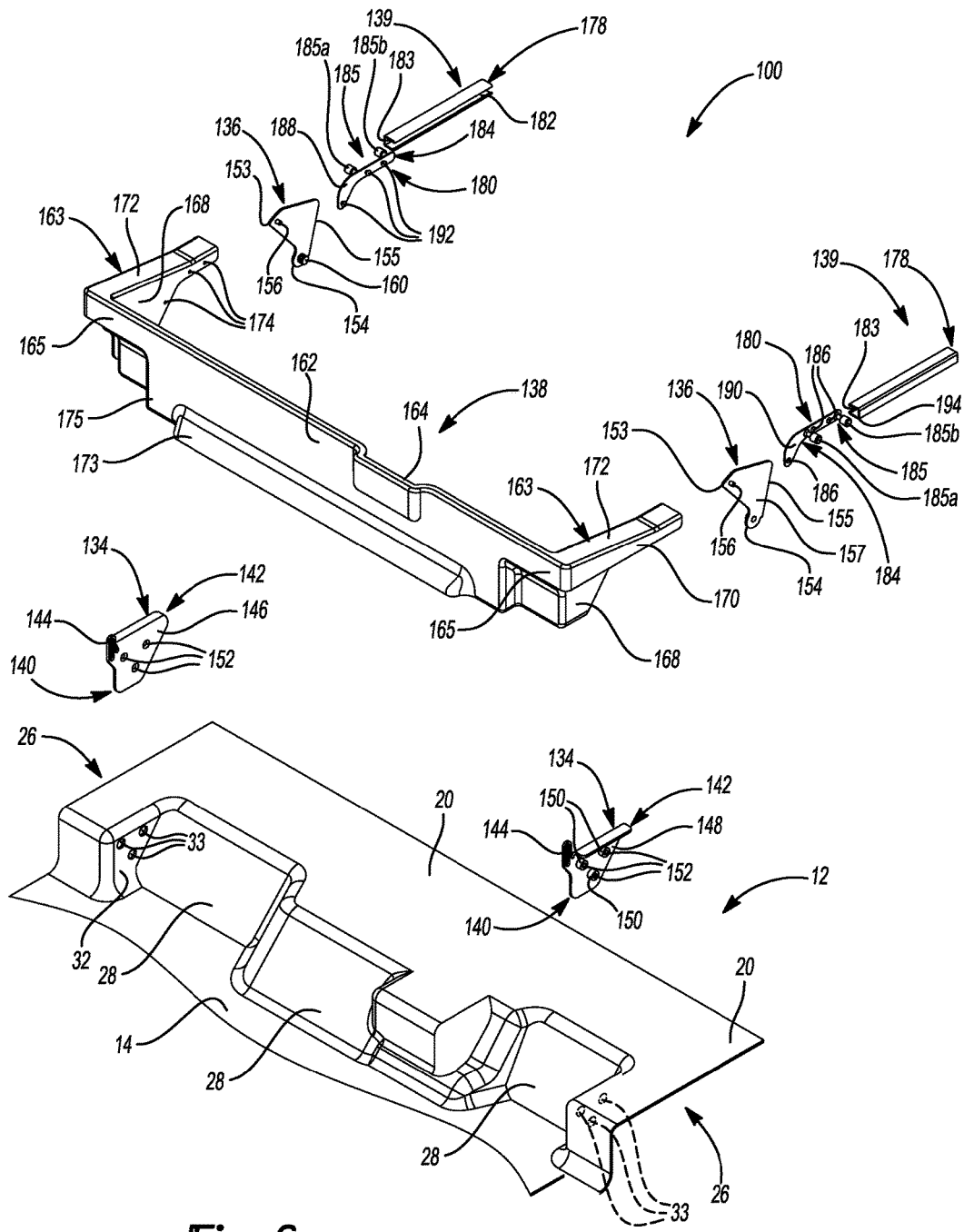
FIG. 6 is an exploded view of another vehicle cargo assembly.

Each end member 163 extends perpendicularly from a corresponding end 165 of the body 162 and includes an inner wall 168, an outer wall 170, and a connector wall 172. The inner wall 168 extends perpendicular from the connector wall 172 toward the vehicle floor 14 and includes a plurality of rail apertures 174 (FIG. 6). The outer wall 170 extends perpendicular from the connector wall 172 toward the vehicle floor 14. The inner wall 168, the outer wall 170, and the connector wall 172 define a cavity 175 (FIG. 7) in the end member 163.

The receptacle body 138 includes design features that accommodate particular needs of a vehicle that the vehicle cargo assembly 100 is installed therein. For example, in the exemplary embodiment, a protruding member 173 projects from a bottom of the elongated body 162 of the receptacle body 138 to facilitate movement of the receptacle body 138 along the vehicle floor 14. The elongated body 162 of the receptacle 138 in the illustrated embodiment also includes depressions 177 at each end 165 such that pockets (not shown) in the vehicle floor 14 are accessible once the receptacle 138 is in the deployed position.

Each rail assembly 139 is received in a corresponding cavity 175 (FIG. 7) of the end member 163 and includes a C-channel rail 178 and a roller mechanism 180. As shown in FIGS. 6 and 7, the C-channel rail 178 attaches to the flange 142 of the corresponding bracket plate 134 such that a side opening 182 (FIG. 6) faces the inner wall 168 of the end member 163 (FIG. 7) and a front opening 183 faces the body 162 of the receptacle 138 (FIG. 7). The roller mechanism 180 includes a roller plate 184 and a roller set 185 (a front roll 185*a* and a rear roll 185*b*). The roller plate 184 has a plurality of apertures 186 (FIG. 6), an inner surface 188 (FIG. 7), and an outer surface 190 (FIG. 6). The plurality of apertures 186 are aligned with the plurality of rail apertures 174 of the inner wall 168 so that fasteners 192 (e.g., rivets) extend through the apertures 186, 174 to attach the roller plate 184 to the inner wall 168 (FIG. 7). In this way, the inner surface 188 of the roller plate 184 abuts against the inner wall 168 of the end member 163. The roller set 185 extends outward from the outer surface 190 of the roller plate 184 and is received in the front opening 183 of the C-channel rail 178, thereby permitting the front roll 185*a* and the rear roll 185*b* to roll along a bottom surface 194 of the C-channel as the receptacle 138 moves between the stowed position and the deployed position.

With continued reference to FIGS. 6-9, operation of the vehicle cargo assembly 100 will be described in detail. When the vehicle cargo assembly 100 is in the stowed position, each rail assembly 139 is substantially entirely received in the cavity 175 (FIG. 7) of a corresponding end member 163. While at least one seat bottom is in the lifted state as described above, the user is able to access the storage compartment 118 defined by the receptacle 138 to store objects (not shown) therein.

Figure 9:
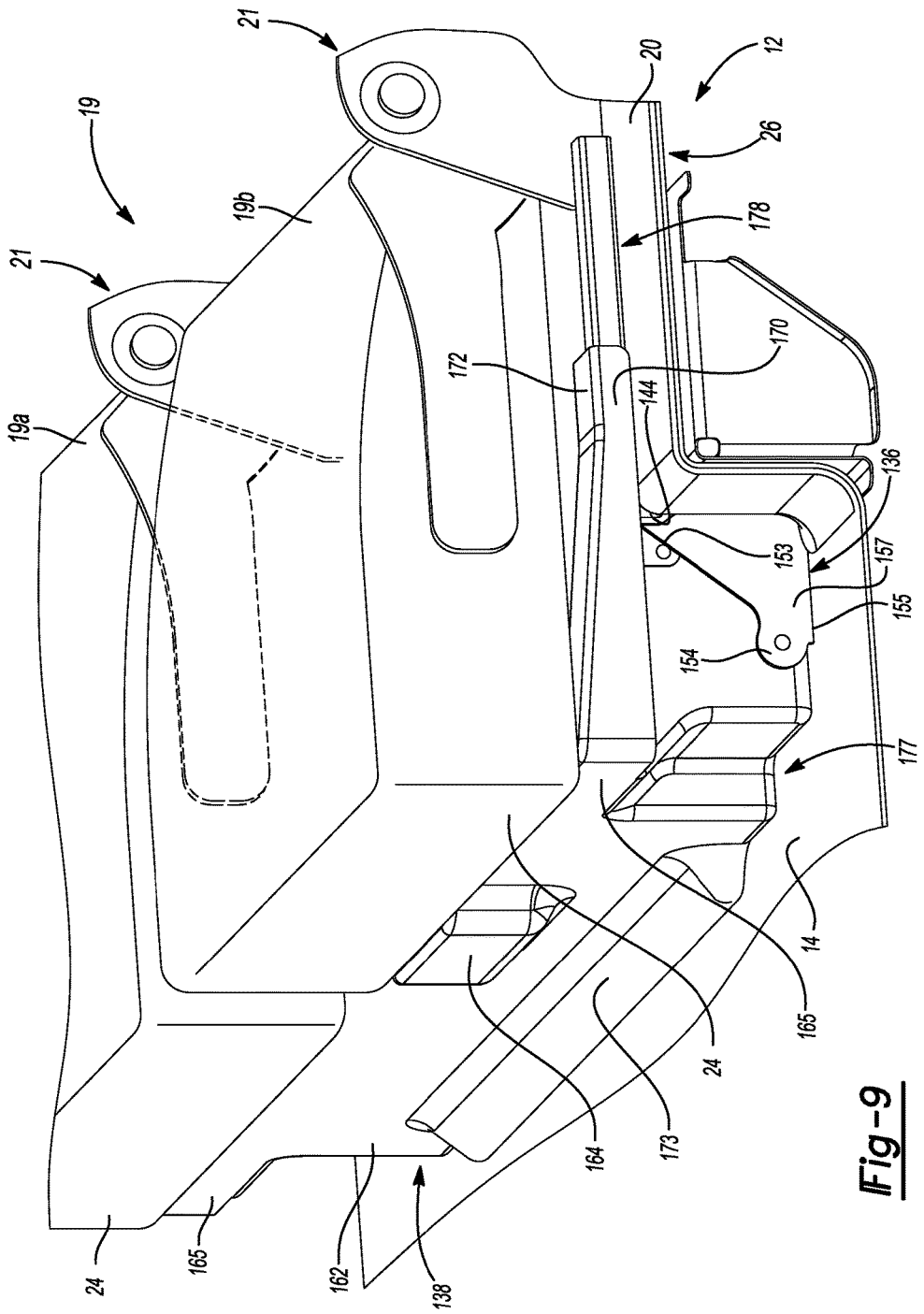
FIG. 9 is a perspective view of the vehicle cargo assembly of FIG. 6 attached to the elongate seat support member of the vehicle floor in the deployed position with the seat bottoms in a seated state.
Figure 10:
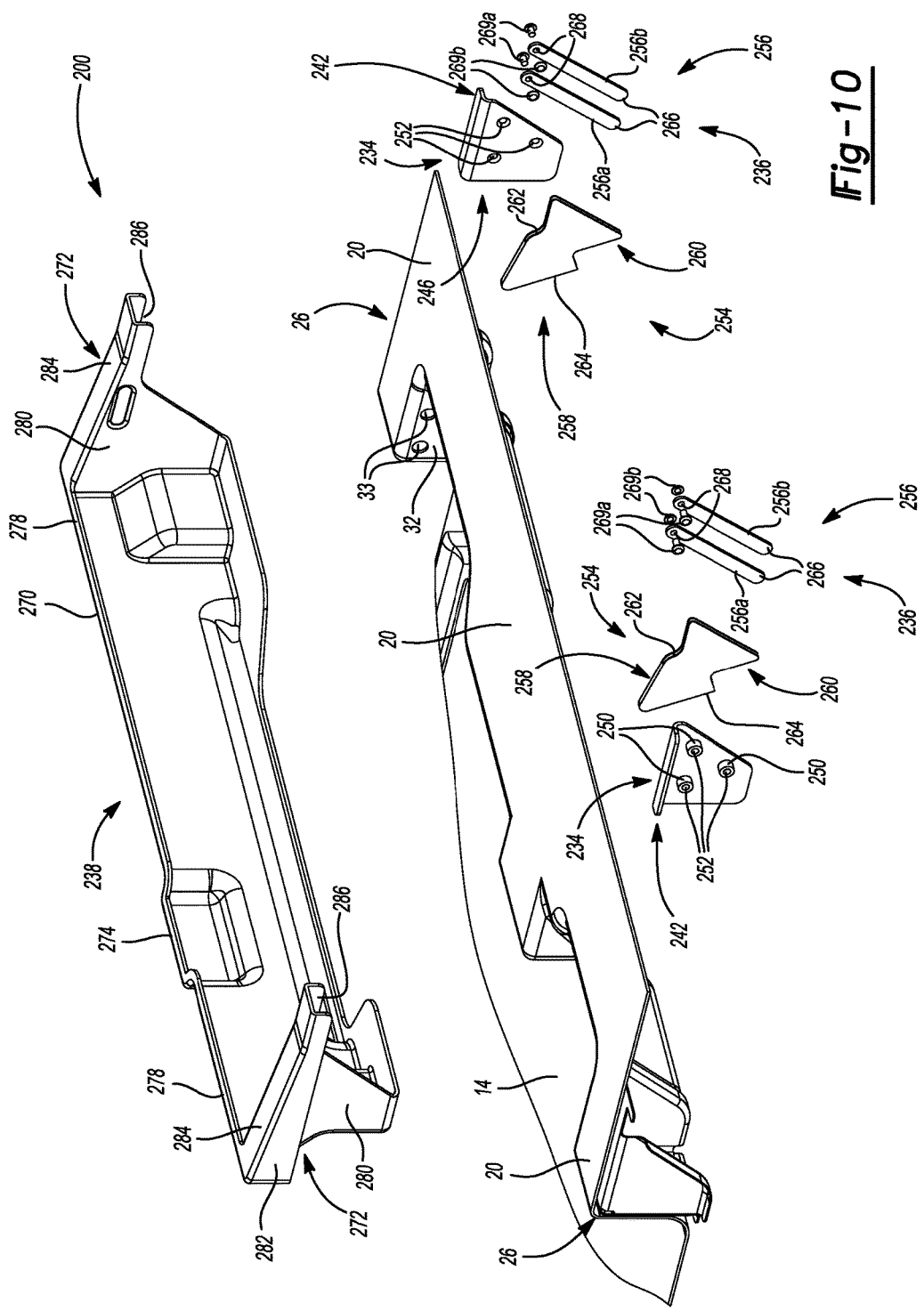
FIG. 10 is an exploded view of yet another vehicle cargo assembly.
Figure 11:
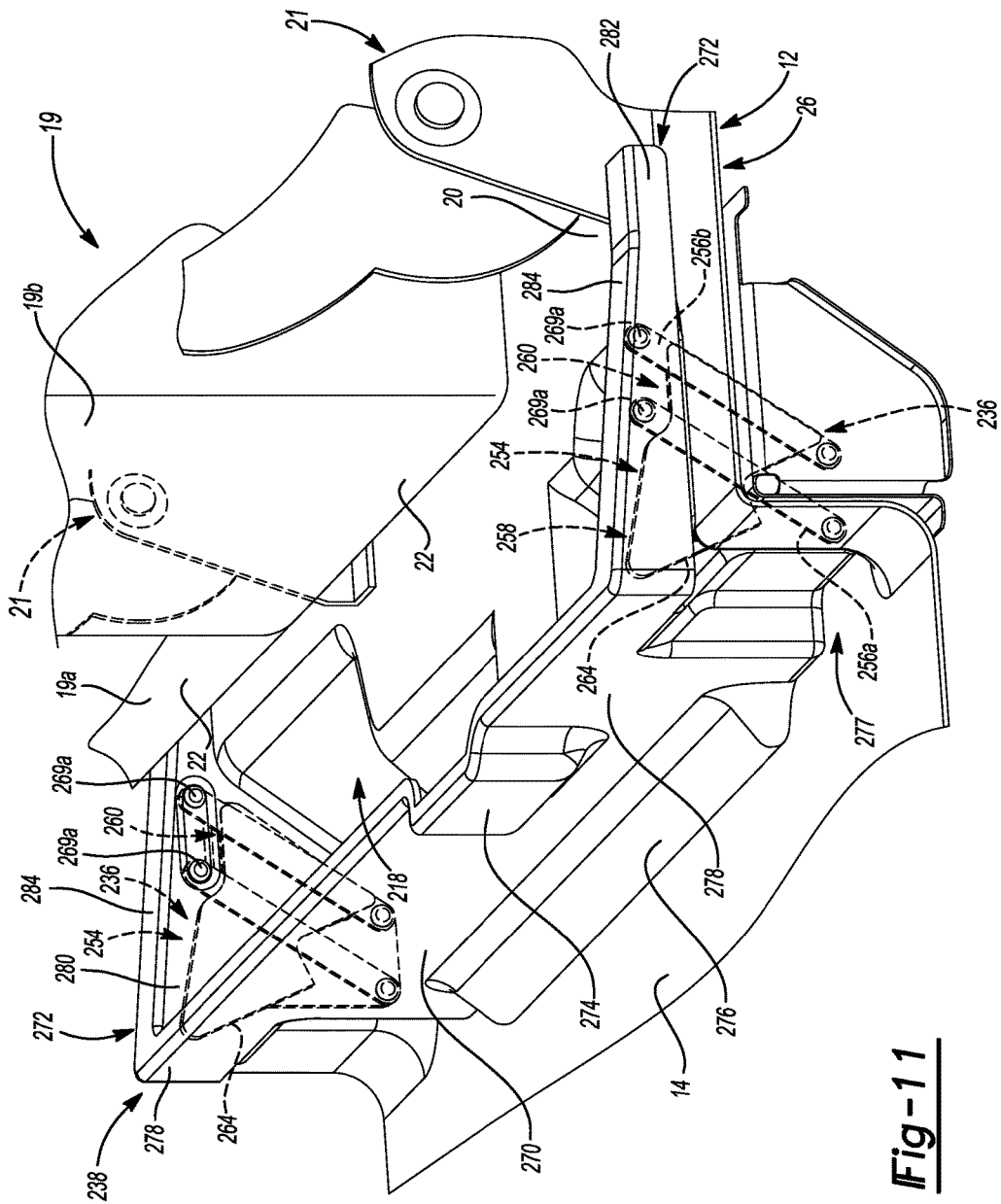
FIG. 11 is a perspective view of the vehicle cargo assembly of FIG. 10 attached to the elongate seat support member of the vehicle floor in a stowed position with the seat bottoms in the lifted state.

If the user desires extra storage space, the user grasps the handle 164 of the body 162 of the receptacle 138 and moves the receptacle 138 to the deployed position. During movement of the receptacle 138 to the deployed position, each roller set 185 rolls along a corresponding bottom surface 194 of the C-channel rail 178 as each pin 156 of the pair of cover plates 136 traverse corresponding vertical slot 144 of the bracket plate 134 causing the cover plate 136 to rotate downwardly. Once the receptacle 138 is in the deployed position, a rear portion of the C-channel rail 178 is exposed from the cavity 175 (FIG. 8). The at least one seat bottom (19*a* and/or 19*b*) is rotated to the seated state and the receptacle 138, the pair of cover plates 136, and the pair of bracket plates 134 define the storage compartment 18 extending from the rear end 22 of the set of seat bottoms 19 to the front end 24 thereof (FIG. 9).

With reference to FIGS. 10-13, another vehicle cargo assembly 200 is provided that can be movably attached to the elongated seat support member 12 extending from the vehicle floor 14 instead of the vehicle cargo assemblies 10, 100. The structure and function of the vehicle cargo assembly 200 may be similar or identical to that of the vehicle cargo assemblies 10, 100, apart from any exceptions described below.

The vehicle cargo assembly 200 is movably attached to the elongated seat support member 12 extending from the vehicle floor 14 such that the vehicle cargo assembly 200 and the elongated seat support member 12 cooperate to form a storage compartment 218. The vehicle cargo assembly 200 includes a pair of bracket plates 234, a pair of cover assemblies 236, a U-shaped receptacle body 238. Each bracket plate 234 includes an inner wall plate 240 and a flange 242. The inner wall plate 240 includes a front surface 246 and a rear surface 248. A plurality of fastening members 250 that correspond to a plurality of apertures 252 fasten the bracket plates 234 to the plurality of apertures 33 of the inner wall 32 to securely attach the bracket plate 234 to the inner wall 32. The flange 242 extends perpendicularly from a top portion of the bracket plate 234 and seats on the elongated seat support member 12 (FIG. 12) extending from the vehicle floor 14 to further support the bracket plate 234 attached to the inner wall 32.

Figure 12:
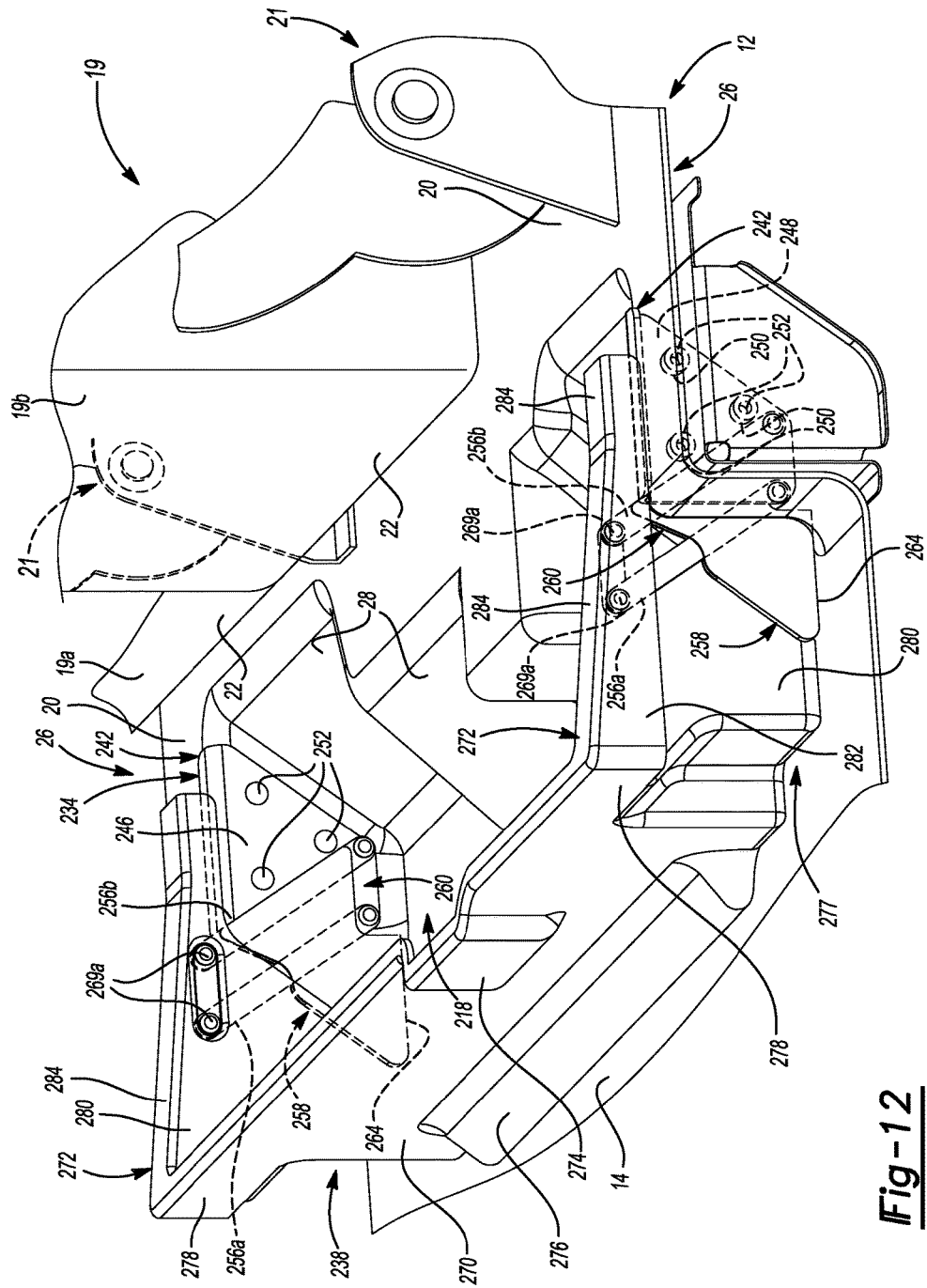
FIG. 12 is a perspective view of the vehicle cargo assembly of FIG. 10 attached to the elongate seat support member of the vehicle floor in a deployed position with the seat bottoms in the lifted state.

Each cover assembly 236 is rotatably engaged to a corresponding bracket plate 234 and is coupled to the receptacle body 238. Each cover assembly 236 includes an arrow shaped cover 254 and a link set 256 including a front link 256*a* and a rear link 256*b*. The arrow shaped cover 254 includes a front portion 258 and a rear portion 260. The front portion 258 has a vehicle floor contact surface 264 that abuts against the vehicle floor 14 once the receptacle 138 is in the deployed position (FIG. 12). The rear portion 260 defines a slot 262 (FIG. 10) that the link set 256 extends through. The front link 256*a* and the rear link 256*b* of the link set 256 have a bracket end 266 and a receptacle end 268. The bracket end 266 is rotatably attached to the corresponding bracket plate 234 (FIG. 12) and the receptacle end 268 is attached to the receptacle body 238 (FIGS. 11 and 12) via a bolt 269*a* and washer 269*b* so that the front link 256*a* and the rear link 256*b* simultaneously rotate as the receptacle body 238 is moved between the stowed position and the deployed position. The rear link 256*b* of the link set 256 is attached to the rear portion 260 of the arrow shaped cover within the slot 262 such that the arrow shaped cover 254 also rotates as the receptacle body 238 is moved between the stowed position and deployed position. Once the receptacle 238 is in the deployed position, the arrow shape cover 254 forms a wall of the storage compartment 218.

The U-shaped receptacle body 238 extends underneath the set of seat bottoms 19, and includes an elongated body 270 and end members 272. The elongated body 270 is substantially rectangular and includes a handle 274 that extends away from the storage compartment 218 at an upper portion of the elongated body 270 to permit a user to facilitate movement of the receptacle body 238 between the stowed and deployed positions.

Each end member 272 extends perpendicularly outward from a corresponding end 278 of the elongated body 270 and includes an inner wall 280, an outer wall 282, and a connector wall 284. The inner wall 280 extends perpendicular outward from an end of the connector wall 284 toward the vehicle floor 14 and the outer wall 282 extends perpendicularly outward from another end of the connector wall 284 toward the vehicle floor 14. The inner wall 280, the outer wall 282, and the connector wall 284 define a cavity 286 (FIG. 10) in the end member 272. The receptacle ends 268 of the link set 256 are attached to the inner wall 280 of the end member 272 within the cavity 286. The receptacle body 238 includes design features that accommodate particular needs of a vehicle that the vehicle cargo assembly 200 is installed therein. For example, in the illustrated embodiment, a protruding member 276 projects from a bottom of the elongated body 270 of the receptacle body 238 to facilitate movement of the receptacle 238 along the vehicle floor 14 between the stowed position and the deployed position. The elongated body 270 of the receptacle 238 in the illustrated embodiment also includes depressions 277 at each end 278 such that pockets (not shown) in the vehicle floor 14 are accessible once the receptacle 238 is in the deployed position.

With continued reference to FIGS. 10-13, operation of the vehicle cargo assembly 200 will be described in detail. When the vehicle cargo assembly 200 is in the stowed position, and at least one seat bottom 19b is in the lifted state as described above, the user (not shown) is able to access the storage compartment 218 defined by the receptacle 238 to store objects (not shown) therein.

Figure 13:
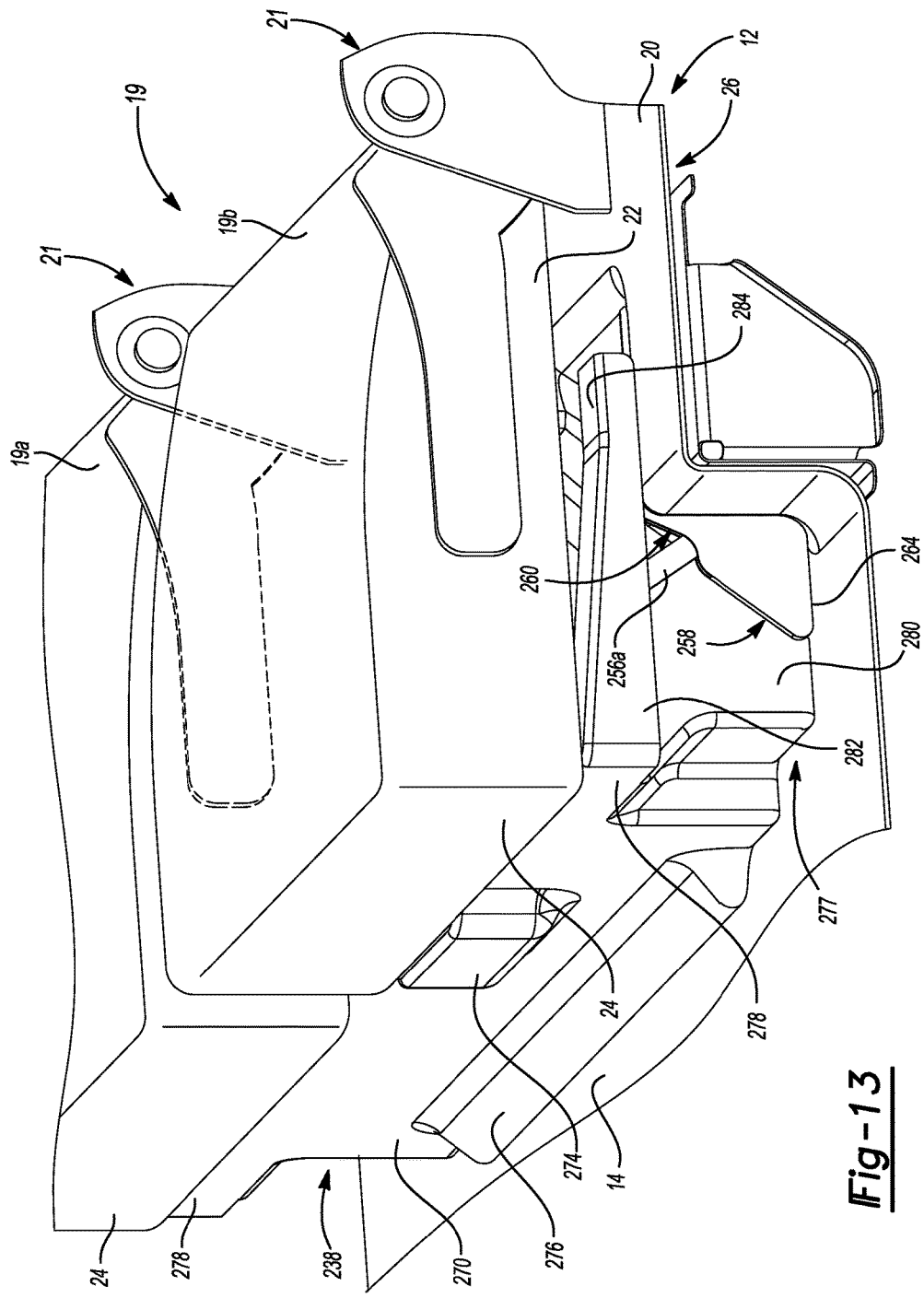
FIG. 13 is a perspective view of the vehicle cargo assembly of FIG. 10 attached to the elongate seat support member of the vehicle floor in the deployed position with the seat bottoms in a seated state.

If the user desires extra storage space, the user grasps the handle 274 of the elongated body 270 of the receptacle body 238 and moves the receptacle body 238 to the deployed position. During movement of the receptacle body 238 to the deployed position, the link set 256 of each cover assembly 236 rotates causing the arrow shaped cover 254 attached to the rear link 256b to rotate. Once the receptacle body 238 is fully deployed, the vehicle floor contact surface 264 of the front portion 258 of the arrow shaped cover 254 abuts against the vehicle floor 14. The at least one seat bottom (19a and/or 19b) is rotated to the seated state and the receptacle 238, the pair of cover assemblies 236, and the pair of bracket plates 234 define the storage compartment 218 extending from the rear end 22 of the set of seat bottoms 19 to the front end 24 thereof (FIG. 13).

The foregoing description of the embodiments has been provided for purposes of illustration and description. It is not intended to be exhaustive or to limit the disclosure. Individual elements or features of a particular embodiment are generally not limited to that particular embodiment, but, where applicable, are interchangeable and can be used in a selected embodiment, even if not specifically shown or described. The same may also be varied in many ways. Such variations are not to be regarded as a departure from the disclosure, and all such modifications are intended to be included within the scope of the disclosure.

What is claimed is:

1. A vehicle cargo assembly that is located between a seat and a floor of the vehicle, comprising:
   a support member that supports the seat and is fixed to the floor;
   a receptacle body that is movably coupled to the support member between a stowed and deployed position;
   a pair of bracket plates that are fixed to opposing ends of the support member; and
   a pair of cover plates that rotatably couple the receptacle body to the pair of brackets plates,
   wherein the receptacle body is movable between the stowed position in which the receptacle body defines a storage compartment, and a deployed position in which the receptacle body, the pair of cover plates, and the pair of bracket plates define the storage compartment.

2. The vehicle cargo assembly of claim 1, wherein the receptacle body includes a pair of slots formed therein for receipt of the pair of cover plates in the stowed position.

3. The vehicle cargo assembly of claim 2, wherein the bracket plate defines a slot for receipt of the cover plate such that the cover plate is positioned between the slot of the receptacle body and the slot of the bracket plate when in the stowed position.

4. The vehicle cargo assembly of claim 2, wherein the cover plate extends from the slot of the receptacle body when in the deployed position, and forms a wall of the storage compartment when in the deployed position.

5. The vehicle cargo assembly of claim 1, further comprising a pair of rail assemblies, each rail assembly is attached to a corresponding bracket plate of the pair of bracket plates and attached to a corresponding end of the receptacle.

6. The vehicle cargo assembly of claim 5, wherein the receptacle defines a pair of cavities, and each rail assembly is received within a respective cavity in the stowed position and extends from the respective cavity in the deployed position.

7. The vehicle cargo assembly of claim 5, wherein each bracket plate includes a vertically oriented slot that is adjacent to a respective rail assembly.

8. The vehicle cargo assembly of claim 7, wherein the cover plate includes a pin that is engaged with the vertically oriented slot of the bracket plate.

9. The vehicle cargo assembly of claim 8, wherein the pin vertically traverses the slot as the cover plate rotates relative to the bracket plate during movement of the receptacle to the deployed position.

10. The vehicle cargo assembly of claim 1, wherein the cover plate is rotatably engaged to the corresponding bracket plate via a link set having a front link and a rear link, and wherein the receptacle is connected to the cover plate via the link set.

11. The vehicle cargo assembly of claim 10, wherein the link set extends through a slot formed in the cover plate.

12. A vehicle cargo assembly that is located between a seat and a floor of the vehicle, comprising:
   a support member that supports the seat and is fixed to the floor;
   an elongated receptacle body that is movably coupled to the support member between a stowed and deployed position;
   a pair of stationary bracket plates that are positioned proximate to opposing ends of the support member;
   a pair of cover plates that rotatably couple the receptacle body to the pair of stationary brackets plates,
   wherein the receptacle body is movable between the stowed position in which the receptacle body defines a storage compartment, and a deployed position in which the receptacle body, the pair of cover plates, and the pair of bracket plates define the storage compartment,
   wherein the elongated receptacle body defines a pair of cavities for receipt of the cover plates when the elongated receptacle body is in the stowed position, and
   wherein, in the deployed position, the cover plates extend from the slots to define a wall of the storage compartment.

13. The vehicle cargo assembly of claim 12, further comprising a pair of rail assemblies, each rail assembly is attached to a corresponding bracket plate of the pair of bracket plates and attached to a corresponding end of the receptacle body.

14. The vehicle cargo assembly of claim 13, wherein each rail assembly is received within a respective cavity in the stowed position and extends from the respective cavity in the deployed position.

15. The vehicle cargo assembly of claim 13, wherein each bracket plate includes a vertically oriented slot that is adjacent to a respective rail assembly.

16. The vehicle cargo assembly of claim 15, wherein the cover plate includes a pin that is engaged with the vertically oriented slot of the bracket plate.

17. The vehicle cargo assembly of claim 16, wherein the pin vertically traverses the slot as the cover plate rotates relative to the bracket plate during movement of the receptacle body to the deployed position.

18. The vehicle cargo assembly of claim 12, wherein the cover plate is rotatably engaged to the corresponding bracket plate via a link set having a front link and a rear link, and wherein the receptacle body is connected to the cover plate via the link set.

19. The vehicle cargo assembly of claim 18, wherein the link set extends through a slot formed in the cover plate.

\* \* \* \* \*